(12) United States Patent
Liu et al.

(10) Patent No.: US 9,973,377 B2
(45) Date of Patent: May 15, 2018

(54) PROTECTION AGAINST DUAL FAILURES FOR RESILIENT TWO LAYER NETWORKS

(71) Applicant: Futurewei Technologies, Inc., Plano, TX (US)

(72) Inventors: Victor Yu Liu, Oakland, CA (US); Yufei Wang, Holmdel, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 139 days.

(21) Appl. No.: 14/974,409

(22) Filed: Dec. 18, 2015

(65) Prior Publication Data

US 2016/0182147 A1 Jun. 23, 2016

Related U.S. Application Data

(60) Provisional application No. 62/094,630, filed on Dec. 19, 2014.

(51) Int. Cl.
*H04L 12/24* (2006.01)
*H04L 12/751* (2013.01)
(Continued)

(52) U.S. Cl.
CPC ....... *H04L 41/0654* (2013.01); *H04B 10/038* (2013.01); *H04L 12/437* (2013.01);
(Continued)

(58) Field of Classification Search
CPC ....... H04B 10/038; H04L 45/04; H04L 45/22; H04L 45/28; H04L 45/64;
(Continued)

(56) References Cited

U.S. PATENT DOCUMENTS

2007/0280251 A1 12/2007 Wang et al.
2012/0213079 A1* 8/2012 Conway ............... H04L 45/128
370/238
(Continued)

FOREIGN PATENT DOCUMENTS

CN 1756225 A 4/2006
CN 102821009 A 12/2012

OTHER PUBLICATIONS

Fernandez-Palacios, J. P., et al., "IP and Optical Convergence: Use Cases and Technical Requirements," White Paper, Jan. 2014, 25 pages.

(Continued)

*Primary Examiner* — Joshua Kading
(74) *Attorney, Agent, or Firm* — Conley Rose, P.C.

(57) ABSTRACT

A method comprising identifying a physical ring in a physical layer of a network according to a logical ring in a logical layer of the network, wherein the logical ring is formed from a plurality of nodes interconnected by a plurality of logical links, and wherein the physical ring is formed from at least the plurality of nodes interconnected by a first plurality of physical links, computing a plurality of cross cord paths across the physical ring, and mapping the logical ring onto the physical layer to provide dual physical link failure survivability by determining primary paths and secondary paths for the plurality of logical links over the physical ring and the plurality of cross cord paths such that a secondary path of a first of the plurality of logical links is non-overlapping with a primary path of a second of the plurality of logical links.

20 Claims, 13 Drawing Sheets

(51) Int. Cl.

| | |
|---|---|
| *H04L 29/14* | (2006.01) |
| *H04L 12/437* | (2006.01) |
| *H04B 10/038* | (2013.01) |
| *H04L 12/715* | (2013.01) |
| *H04L 12/707* | (2013.01) |
| *H04L 12/703* | (2013.01) |
| *H04J 14/02* | (2006.01) |
| *H04L 12/735* | (2013.01) |

(52) U.S. Cl.
 CPC ............ *H04L 41/12* (2013.01); *H04L 41/145* (2013.01); *H04L 45/02* (2013.01); *H04L 45/22* (2013.01); *H04L 45/28* (2013.01); *H04L 45/64* (2013.01); *H04L 69/40* (2013.01); *H04J 14/0287* (2013.01); *H04L 45/1283* (2013.01)

(58) Field of Classification Search
 CPC .. H04L 45/128–45/1283; H04L 12/437; H04L 41/06; H04L 41/0654; H04L 47/746; H04L 67/1076; H04J 3/085; H04J 14/0268
 See application file for complete search history.

(56) References Cited

U.S. PATENT DOCUMENTS

| | | | | |
|---|---|---|---|---|
| 2015/0350025 | A1* | 12/2015 | Kadohata | ................ H04L 45/62 370/254 |
| 2016/0173338 | A1* | 6/2016 | Wolting | ................ H04L 41/145 709/223 |

OTHER PUBLICATIONS

Gerstel, O., "Multi-Layer Capacity Planning for IP-Optical Networks," IEEE Communications Magazing, Jan. 2014, pp. 44-51.
Prinz, R., et al., "Dual Failure Protection in Multilayer Networks based on Overlay or Augmented Model," International Workshop on Deign of Reliable Communication Networks, Oct. 16-19, 2005, 8 pages.
Liu, V., et al., "Spare Capacity allocation using shared backup path protection for dual link failures," Computer Communications, 2012, 12 pages.
Clouqueur, M., et al., "Availability Analysis of Span-Restorable Mesh Networks," IEEE Journal on Selected Areas in Communications, vol. 20, No. 4, May 2002, pp. 810-821.
Doucette, J., et al., "On the availability and capacity requirements of shared backup path-protected mesh networks," Optical Network Magazine, Nov.-Dec. 2003, pp. 29-44.
Modiano, E., et al., "Survivable Lightpath Routing: A New Approach to the Design of WDM-Based Networks," IEEE Journal on Selected Areas in Communications, vol. 20, No. 4, May 2002, 10 pages.
Kurant, M., et al., "Survivable Routing of Mesh Topologies in IP-over-WDM Networks by Recursive Graph Contraction," IEEE Journal on Selected Areas in Communications, vol. 25, No. 5, Jun. 2007, pp. 922-933.
Liu, Y., et al., "Spare Capacity Allocation in Two-Layer Networks," IEEE Journal on Selected Areas in Communications, vol. 25, No. 5, Jun. 2007, pp. 974-986.
Sui, Z., et al., "Dual Failure Resiliency on Single Failure Protected Packet Optical Integrated Networks," Mar. 25-27, 2015, 3 pages.
Liu, Y., et al., "Approximating Optimal Spare Capacity Allocation by Successive Survivable Routing," IEEE/ACM Transactions on Networking, vol. 13, No. 1, Feb. 2005, pp. 198-211.
Liu, Y., et al., "Spare Capacity Allocation: Model, Analysis and Algorithm," Telecommunications Program, School of Information Science, 2001, 132 pages.
Thulasiraman, K., et al., "Circuits/Cutsets Duality and a Unified Algorithmic Framework for Survivable Logical Topology Design in IP-over-WDM Optical Networks," IEEE Infocom, 2009, 9 pages.
Zhou, Z., "Novel Survivable Logical Topology Routing in IP-over-WDM Networks by Logical Protecting Spanning Tree Set," Proceedings of the 4th International Workshop on Reliable Networks Design and Modeling (RNDM), Oct. 3-5, 2012, 7 pages.
Tsin, Y., et al., "Yet another optimal algorithm for 3-edge-connectivity," Journal of Discrete Algorithms, 2009, pp. 130-146.
Liu, V., et al., "Spare Capacity Allocation Using Partially Disjoint Paths for Dual Link Failure Protection," 9th International Workshop on the Design of Reliable Communication Networks (DRCN), Mar. 4-7, 2013, pp. 171-178.
Liu, V., et al., "Protection Coordination for Dual Failure on Two-Layer Networks," 11th International Conference on Design of Reliable Communication Networks, Mar. 25-27, 2015, 8 pages.
Foreign Communication From a Counterpart Application, PCT Application No. PCT/CN2015/098006, International Search Report dated Mar. 24, 2016, 7 pages.
Foreign Communication From a Counterpart Application, PCT Application No. PCT/CN2015/098006, Written Opinion dated Mar. 24, 2016, 4 pages.
Narula-Tam, A., et al., "Designing Physical Topologies that Enable Survivable Routing of Logical Rings," XP010688432, Proceedings of the Fourth International Workshop on Design of Reliable Communication Networks, Oct. 19-22, 2003, pp. 379-386.
Hwang, I., et al., "A Novel Dynamic Multiple Ring-based Local Restoration for point-to-multipoint multicast traffic in WDM mesh networks," XP019532822, Photonic Network Communications, vol. 14, No. 1, Jun. 13, 2007, pp. 23-33.
Nguyen, H., Al., "Survivable Physical topology design for All-optical Metro core networks," XP032345825, International Conference on Computing, Management and Telecommunications, Jan. 21, 2013, pp. 38-42.
Grover, W., et al., "High Availability Path Design in Ring-Based Optical Networks," XP040104109, ACM, Jan. 1, 1999, pp. 558-574.
Holness, M., et al., "Ethernet Ring Protection Supplement," XP044045552, International Telecommunication Union, WD36, vol. 9/15, Apr. 30, 2012, 34 pages.
Foreign Communication From a Counterpart Application, European Application No. 15869374.7, Extended European Search Report dated Jan. 24, 2018, 16 pages.

\* cited by examiner

PROTECTION AGAINST DUAL FAILURES FOR RESILIENT TWO LAYER NETWORKS

CROSS-REFERENCE TO RELATED APPLICATIONS

The present application claims priority to U.S. Provisional Patent Application 62/094,630, filed Dec. 19, 2014 by Victor Yu Liu, and entitled "Protection Synergy for Dual Failure on Single Failure Resilient Two Layer Networks," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The layered-architecture of modern communication networks take advantage of the flexibility of upper layer or logical layer technology, such as Internet protocol (IP) and multiprotocol label switching (MPLS), and the high data rates of lower layer or physical layer technology, such as optical transport network (OTN) and automatically switched optical network (ASON). Optical networks may provide up to several terabits per second transmission over a single fiber. Thus, a failure in the physical network, even for a short period of time may result in a large amount of data loss. However, network failures are inevitable. Therefore, protection and recovery schemes for network failures are important for the design of high-speed data networks.

SUMMARY

In one embodiment, the disclosure includes a method comprising identifying, via a processor of a network element (NE), a physical ring in a physical layer of a network according to a logical ring in a logical layer of the network, wherein the logical ring is formed from a plurality of nodes interconnected by a plurality of logical links, and wherein the physical ring is formed from at least the plurality of nodes interconnected by a first plurality of physical links, computing, via the processor, a plurality of cross cord paths across the physical ring between nonadjacent nodes on the logical ring, wherein the plurality of cross cord paths traverses a second plurality of physical links, and mapping, via the processor, the logical ring onto the physical layer to provide dual physical link failure survivability by determining primary paths and secondary paths for the plurality of logical links over the physical ring and the plurality of cross cord paths such that a secondary path of a first of the plurality of logical links is non-overlapping with a primary path of a second of the plurality of logical links. In some embodiments, the disclosure also includes mapping the logical ring by selecting a direction of rotation for the logical ring and the physical ring, sorting the plurality of logical links according to the direction of rotation, and determining that the first logical link connects a head node of the plurality of nodes to a tail node of the plurality of nodes along the logical ring in the direction of rotation, and/or determining the primary path for the first logical link by a first ring link from the first plurality of physical links that connects the head node to the tail node along the physical ring in the direction of rotation, and/or determining the secondary path for the first logical link by selecting a first cord path from the plurality of cross cord paths that extends between the tail node and an end node of the plurality of nodes, and selecting second ring links from the first plurality of physical links that connect the end node to the head node along the physical ring in the direction of rotation, and/or determining the plurality of cross cord paths by computing a first of the plurality of cross cord paths beginning at a first of the plurality of nodes by excluding first ring links of the first plurality of physical links adjacent to the first node, wherein the first cross cord path extends between the first node and a second of the plurality of nodes, selecting a third of the plurality of nodes positioned between the first node and the second node on the physical ring, and computing a second of the plurality of cross cord paths beginning at the third node by excluding second ring links of the first plurality of physical links between the third node and the first node along the physical ring and third ring links of the first plurality of physical links between the third node and the second node along the physical ring, and wherein the second ring links are different from the third ring links, and/or wherein a first of the plurality of cross cord paths crosses at least a second of the plurality of cross cord paths, and/or wherein a first of the plurality of cross cord paths extends between a first of the plurality of nodes and a second of the plurality of nodes, wherein a second of the plurality of cross cord paths extends between the second node and a third plurality of nodes, and wherein the first node is different from the third node, and/or wherein the physical layer comprises an optical network, and/or wherein the logical layer comprises an Internet protocol (IP) network, and/or wherein the logical layer comprises a virtual network.

In another embodiment, the disclosure includes a non-transitory medium configured to store a computer program product comprising computer executable instructions that when executed by a processor cause the processor to identify a physical ring in a physical layer of a network according to a logical ring in a logical layer of the network, wherein the logical ring is formed from a set of ordered nodes interconnected by a plurality of logical links, and wherein the physical ring is formed from at least the set of ordered nodes interconnected by a first plurality of physical links, compute a plurality of cross cord paths across the physical ring in the physical layer between nonadjacent nodes on the logical ring, wherein the plurality of cross cord paths traverses a second plurality of physical links, and determine a primary path and a secondary path for each of the plurality of logical links according to the physical ring and the plurality of cross cord paths such that a secondary path of a first of the plurality of logical links is non-overlapping with a primary path of a second of the plurality of logical links. In some embodiments, the disclosure also includes the instructions that further cause the processor to select a direction of rotation for the physical ring and the logical ring for determining the primary path and the secondary path for each of the plurality of logical links, and/or the instructions that further cause the processor to determine the primary path for each logical link by determining that each logical link connects a head node of the set of ordered nodes to a tail node of the set of ordered nodes along the logical ring in the direction of rotation, and selecting a first ring link from the first plurality of physical links that connects the head node to the tail node along the physical ring in the direction of rotation, and/or the instructions further cause the processor to determine the secondary path for each logical link by selecting a first cord path from the plurality of cross cord paths that extends between the tail node and an end node of the set of ordered nodes, and selecting second ring links from the first plurality of physical links that connect the end node to the head node along the physical ring in the direction of rotation, and/or the instructions further cause the processor to determine the plurality of cross cord paths by computing a first of the plurality of cross cord paths beginning at a first of the set of ordered nodes by excluding first ring links of the first plurality of physical links adjacent to the first node, wherein the first cross cord path extends between the first node and a second of the set of ordered nodes, selecting a third of the set of ordered nodes positioned between the first node and the second node on the physical ring, and computing a second of the plurality of cross cord paths beginning at the third node by excluding second ring links of the first plurality of physical links between the third node and the first node along the physical ring and third ring links of the first plurality of physical links between the third node and the second node along the physical ring, and wherein the second ring links are different from the third ring links.

In yet another embodiment, the disclosure includes a network controller comprising a processor configured to identify a physical ring in a physical layer of a network according to a logical ring in a logical layer of the network, wherein the logical ring is formed from a set of ordered nodes interconnected by a plurality of logical links, and wherein the physical ring is formed from at least the set of ordered nodes interconnected by a first plurality of physical links, compute a plurality of cross cord paths across the physical ring in the physical layer between nonadjacent nodes on the logical ring, wherein the plurality of cross cord paths traverses a second plurality of physical links, determine primary paths for the plurality of links according to the physical ring, and determine secondary paths for the plurality of links according to both the physical ring and the plurality of cross cord paths such that a secondary path of a first of the plurality of logical links is non-overlapping with a primary path of a second of the plurality of logical links, and a transmitter coupled to the processor and configured to send routing instructions to at least one of the set of ordered nodes, wherein the routing instructions indicate at least some of the primary paths and at least some of the secondary paths. In some embodiments, the processor is further configured to select a direction of rotation for the physical ring and the logical ring, and determine that a first of plurality of logical links connects a head node of the set of ordered nodes to a tail node of the set of ordered nodes along the logical ring in the direction of rotation, and wherein determining a primary path for the first logical link comprises selecting a first ring link from the first plurality of physical links that connects the head node to the tail node along the physical ring in the direction of rotation, and/or the processor is further configured to determine the secondary path for the first logical link by selecting a first cord path from the plurality of cross cord paths extending between the tail node and an end node of the set of ordered nodes, and selecting second ring links from the first plurality of physical links that connect the end node to the head node along the physical ring in the direction of rotation, and/or the processor is further configured to determine the plurality of cross cord paths by computing a first of the plurality of cross cord paths beginning at a first of the set of ordered nodes by excluding first ring links of the first plurality of physical links adjacent to the first node, wherein the first cross cord path extends between the first node and a second of the set of ordered nodes, selecting a third of the set of ordered nodes positioned between the first node and the second node on the physical ring, and computing a second of the plurality of cross cord paths beginning at the third node by excluding second ring links of the first plurality of physical links between the third node and the first node along the physical ring and third ring links of the first plurality of physical links between the third node and the second node along the physical ring, and wherein the second ring links are different from the third ring links, and/or the logical layer comprises a software-defined network (SDN), and wherein each of the plurality of nodes are connected to at least two of the first plurality of physical links and at least one of the second plurality of physical links.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A network is referred to as a connected network when there is a path from every node to every other node in the network. A network is referred to as a two-connected network when upon the removal of any single link in the network, the residual network remains connected. A network is referred to as a three-connected network when upon the removal of any two links in the network, the residual network remains connected. Network survivability is the ability to maintain network operation such as routing when one or more network components are in failures. In a layered-network, a logical topology is mapped onto a physical topology or a virtual network is embedded in a physical network, where each logical link or virtual link is spanned by employing one or more paths in the physical topology. For example, when mapping an IP network onto an optical network, a single fiber cut may cause multiple logical links sharing the fiber to fail. Thus, the survivability of a layered-network depends on the underlying physical network and the mapping of the logical layer to the physical layer. Cross-layer survivability mapping refers to a mapping method that maps a logical topology onto a physical topology such that the logical topology remain connected during a physical layer failure. A logical network is required to be at least two-connected in order to survive any single link failures or any dual link failures at the physical layer.

Figure 1:
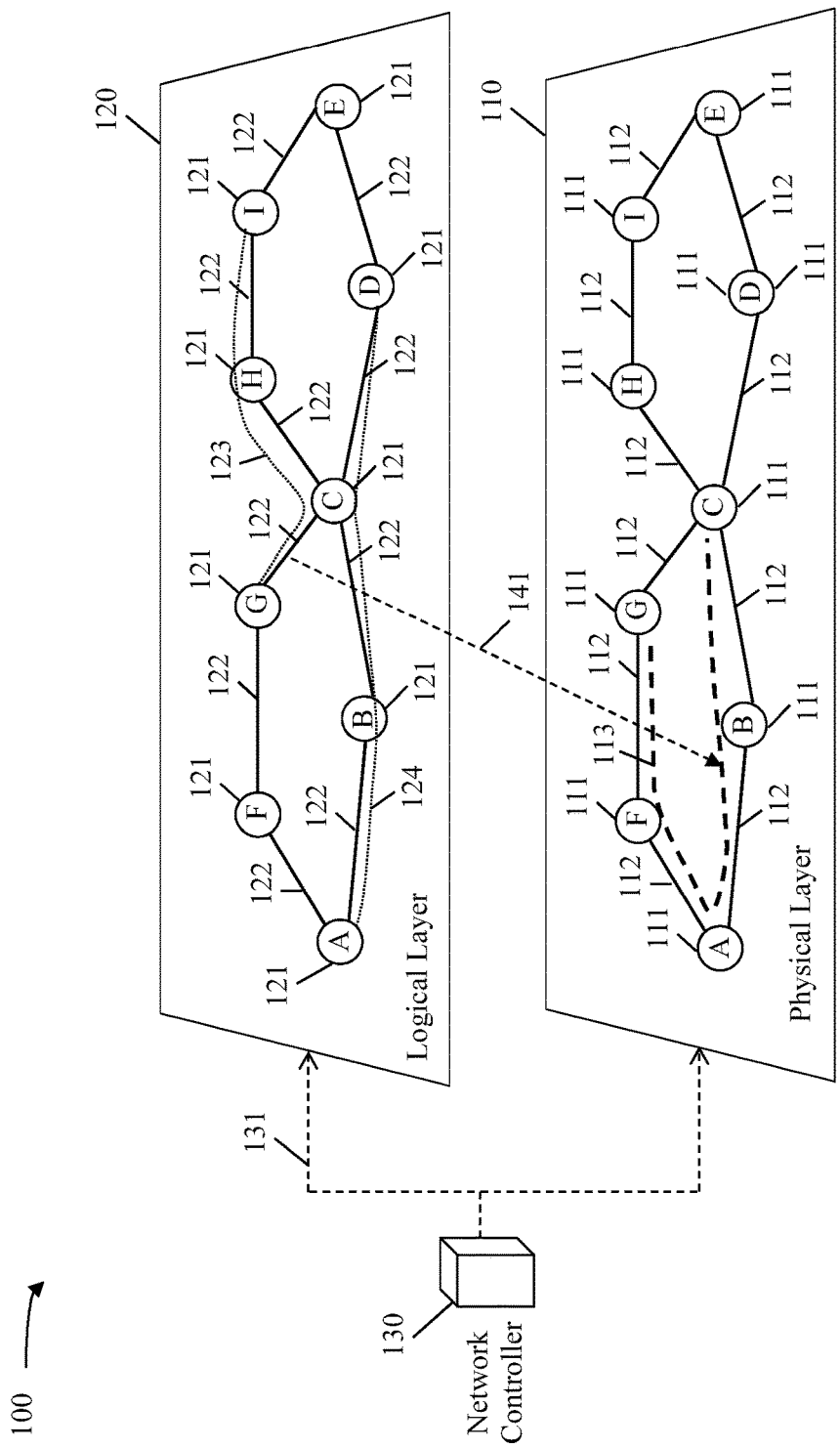
FIG. 1 is a schematic diagram illustrating an embodiment of a cross-layer mapping in a layered-network.

FIG. 1 is a schematic diagram illustrating an embodiment of a cross-layer mapping in a layered-network 100. The network 100 comprises a physical layer 110 and a logical layer 120. The physical layer 110 comprises a plurality of nodes 111, shown as A, B, C, D, E, F, G, H, and I, interconnected by a plurality of physical links 112. The physical links 112 may include electrical links, optical links, and combinations thereof. The interconnection between the nodes 111 and the physical links 112 form a physical topology in the network 100. The nodes 111 may include routers, switches, bridges, optical devices, and combinations thereof that transport data packets and frames through the network 100 via the physical links 112. The logical layer 120 comprises a plurality of nodes 121, shown as A, B, C, D, E, F, G, H, and I, which may correspond to at least a subset of the nodes 111 in the physical layer 110. The plurality of nodes 121 is interconnected by a plurality of logical links 122. The interconnection between the nodes 121 and the logical links 122 forms a logical topology in the network 100.

The logical link 122 between the nodes G and C 121 is mapped to a number of physical links 112 as shown by the dashed line 113. As an example, the logical layer 120 supports two service demands, where one service demand 123 is between the nodes G and I 121 and another service demand 124 is between the nodes A and D 121. When the physical link 112 between the nodes B and C 111 fails, the logical link 122 between the nodes B and C and the logical link 122 between the nodes G and C 121 also fail. Thus, both the service demands 123 and 124 may not be restored.

The mapping between the logical links 122 and the physical links 112 may be determined during network planning or dynamically determined during operation. In an embodiment, the network 100 may be an SDN or a virtual network controlled and managed by a network controller 130. The network controller 130 is communicatively coupled to the nodes 112 and 122 as shown by the dashed arrows 131. The network controller 130 may be any computing or networking device or virtual machine. The network controller 130 obtains a physical topology of the network 100, determines logical-to-physical mapping for the logical links 122 based on the physical topology, and maintains a global view of the network 100. After determining the logical-to-physical mapping for the logical links 122, the network controller 130 may send routing instructions to the nodes 111 and 121.

Figure 2:
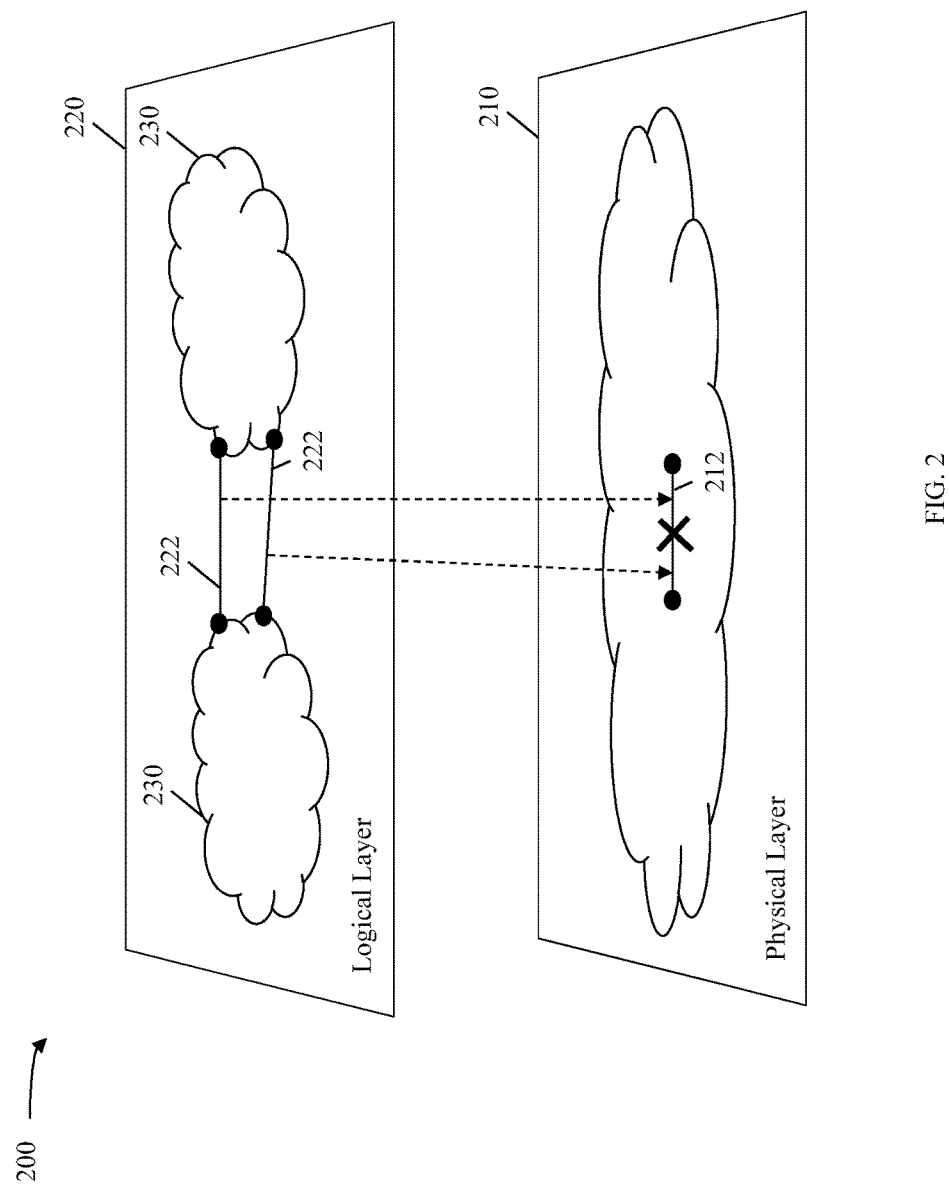
FIG. 2 is a schematic diagram illustrating an embodiment of a single link failure scenario in a single mapping network.

FIG. 2 is a schematic diagram illustrating an embodiment of a single link failure scenario in a single mapping network 200. The network 200 is structurally similar to the network 100 and further illustrates failures associated with single mapping. Single mapping refers to the mapping of a logical link to a single path in the physical topology. For simplicity and without loss of generality, in this illustration the two logical links 222 similar to the logical links 122 are each mapped to a physical path that comprises a single physical link 212 similar to the physical link 112. The network 200 comprises a physical layer 210 similar to the physical layer 110 and a logical layer 220 similar to the logical layer 120. As shown, the physical layer 210 comprises the physical link 212. The physical layer 210 may comprise other nodes similar to the nodes 111 and links similar to the links 112 and 212. The logical layer 220 comprises two logical sub-topologies 230. Each logical sub-topology 230 may comprise nodes similar to the nodes 111 corresponding to nodes in the physical layer interconnected by logical links similar to the logical links 122. The two logical sub-topologies 230 are interconnected by two logical links 222. Thus, the logical topology is referred to as two-connected. The two logical links 222 are mapped to the same physical link 212. A single link failure at the physical link 212, as shown by the cross breaks, the interconnection between the two logical sub-topologies 230. Therefore, the single logical-to-physical mapping in the network 200 may not survive single link failures in the physical layer 210 when cross-layer mapping is not performed appropriately, for example, by considering physical layer failures and mapping the logical links 222 onto different physical links.

Figure 3:
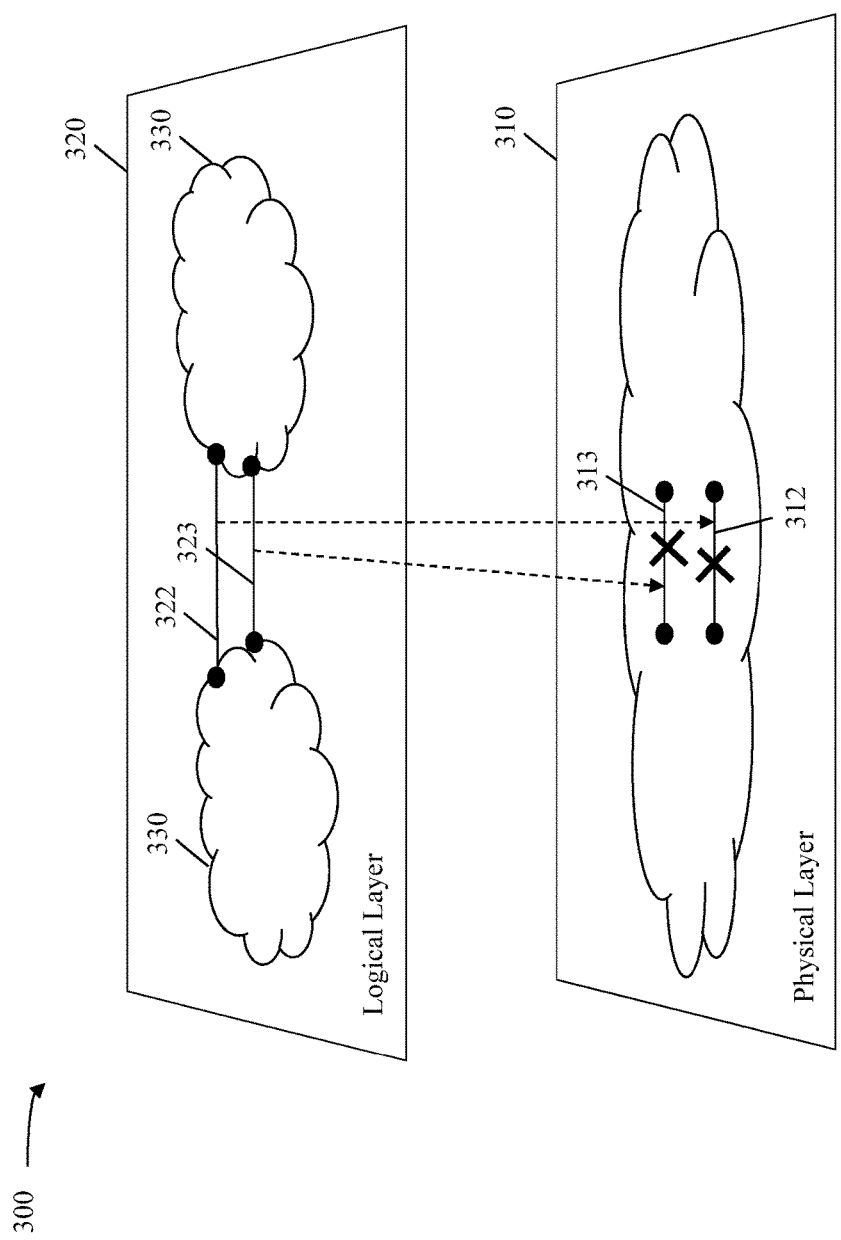
FIG. 3 is a schematic diagram illustrating an embodiment of a dual link failure scenario in a single mapping network.

FIG. 3 is a schematic diagram illustrating an embodiment of a dual link failure scenario in a single mapping network 300. The network 300 is structurally similar to the networks 100 and 200. The network 300 comprises a physical layer 310 similar to the physical layers 110 and 210 and a logical layer 320 similar to the logical layers 120 and 220. As shown, the physical layer 310 comprises two physical links 312 and 313 similar to the physical links 112 and 212. The logical layer 320 comprises two logical sub-topologies 330 similar to the logical sub-topologies 230. The two logical sub-topologies 330 are interconnected by logical links 322 and 323 similar to the logical links 122 and 222. In contrast to the network 200, the logical links 322 and 323 are not mapped onto the same physical links 312 and 313. As shown, the logical link 322 is mapped to the physical link 312, and the logical links 323 is mapped to the physical link 313. Thus, the network 300 may survive single link failures in the physical layer 310. However, dual link failures at the physical links 312 and 313, as shown by the crosses, break the interconnection between the two logical sub-topologies 330. Therefore, although the single logical-to-physical mapping in the network 300 is performed appropriately, a single logical-to-physical mapping may not support dual physical link failure survivability.

Figure 4A:
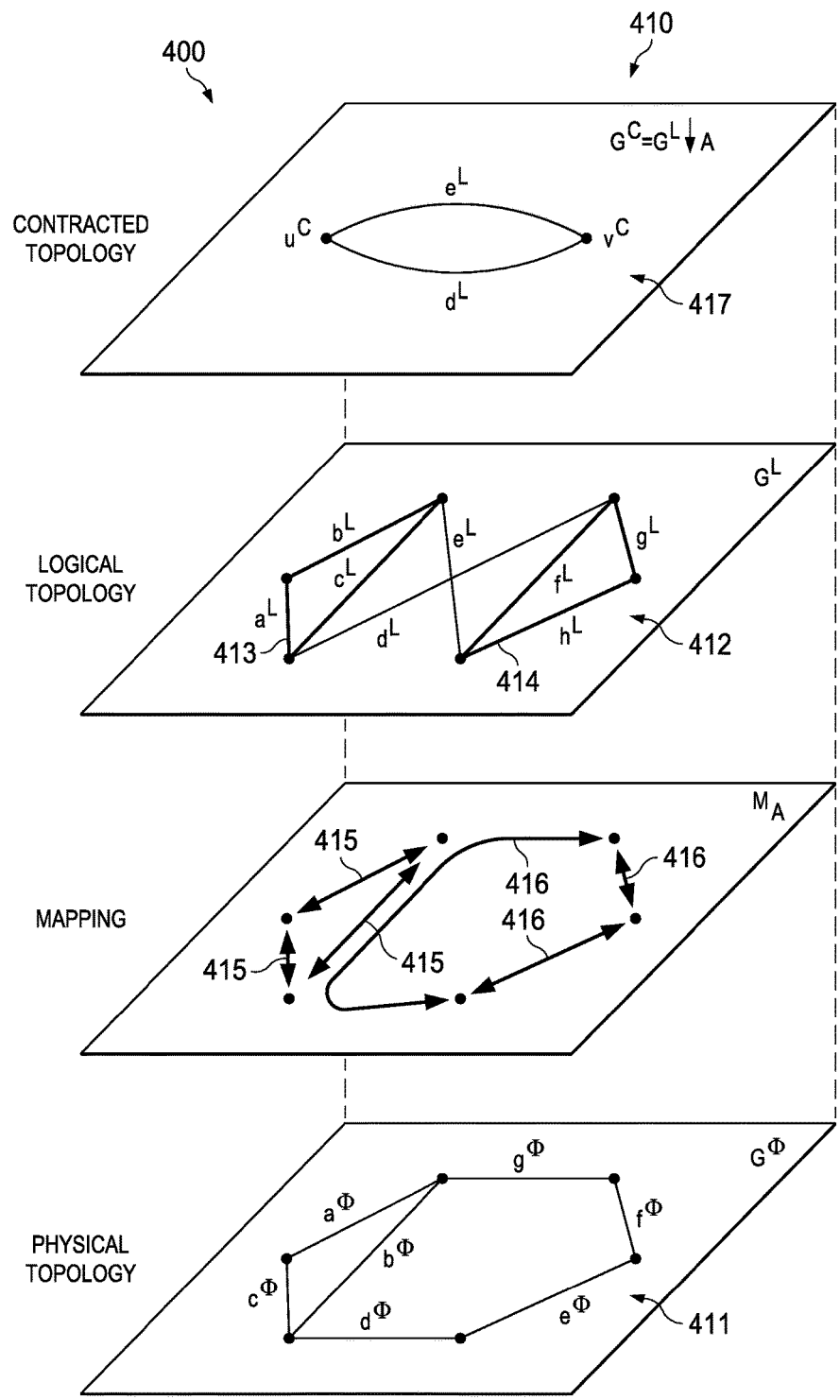
FIG. 4A is a schematic diagram illustrating an embodiment of a first mapping scenario between a logical topology and a physical topology.
Figure 4B:
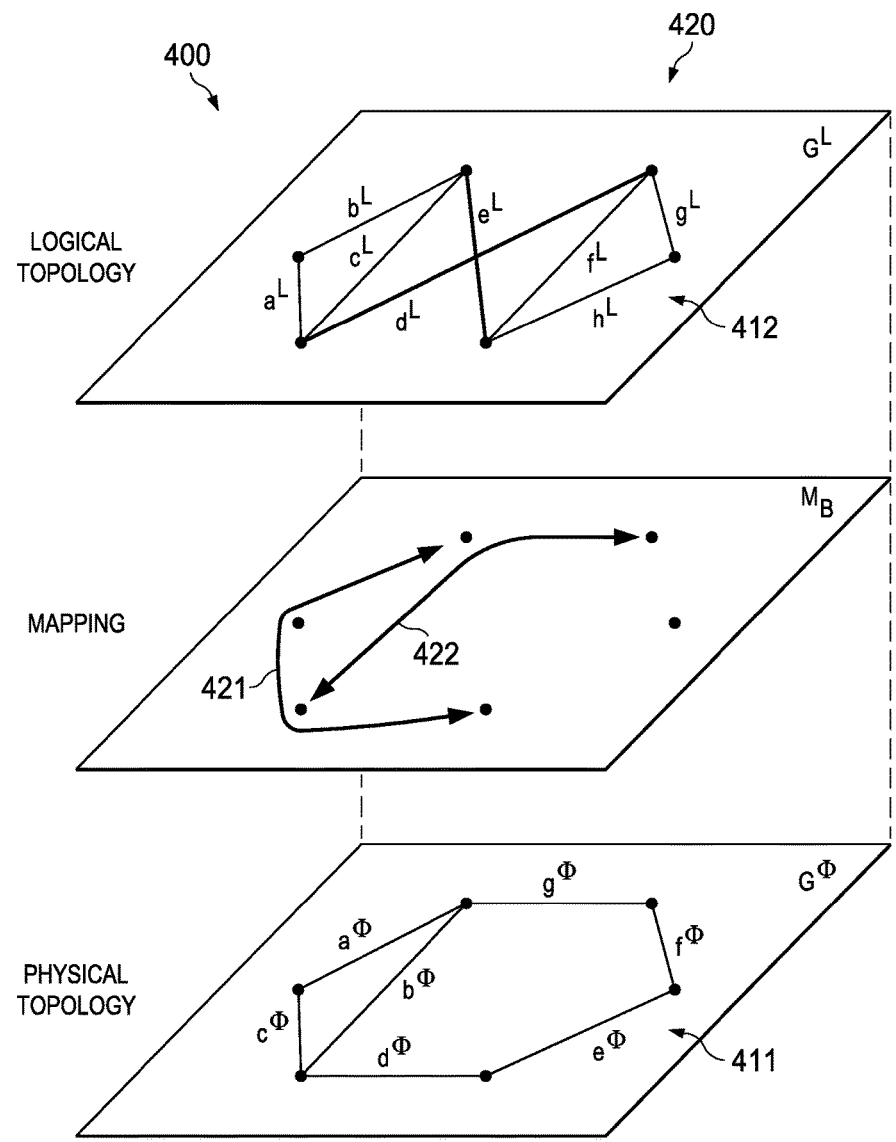
FIG. 4B is a schematic diagram illustrating an embodiment of a second mapping scenario between a logical topology and a physical topology.
Figure 4C:
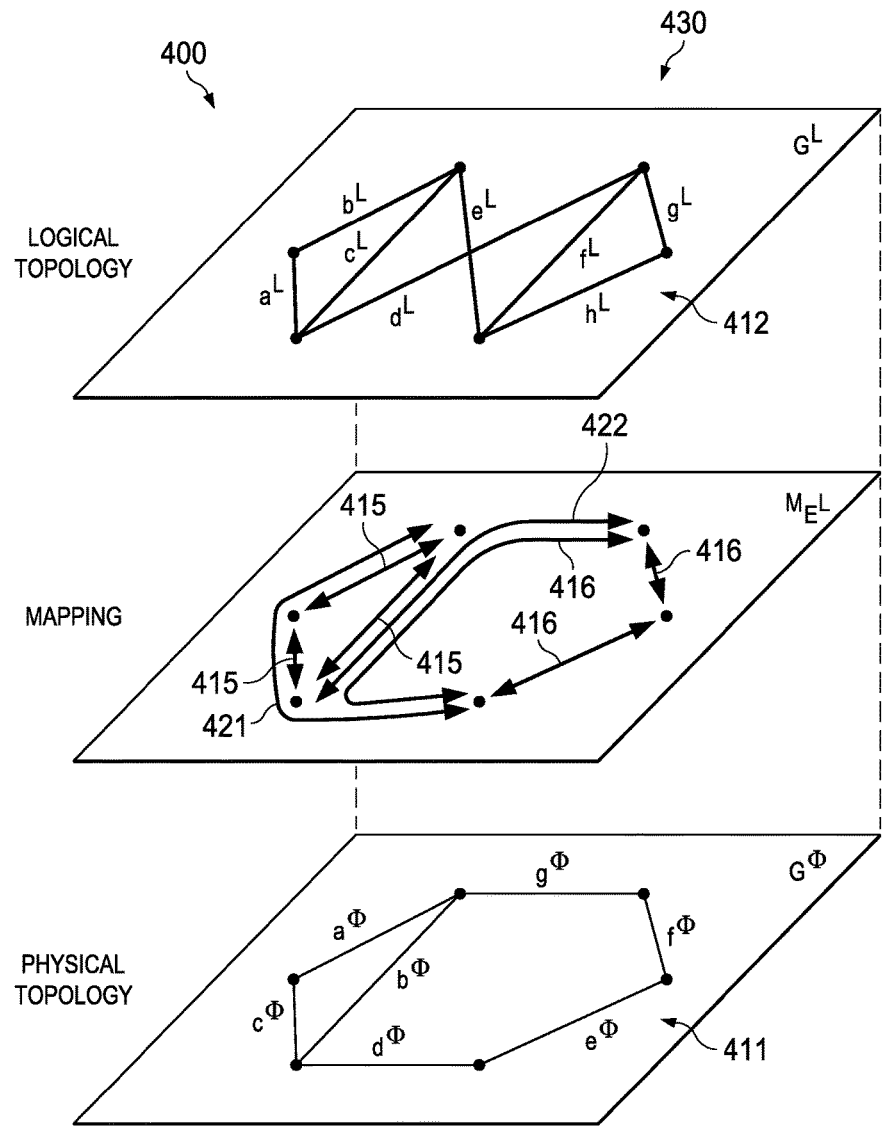
FIG. 4C is a schematic diagram illustrating an embodiment of a final mapping scenario between a logical topology and a physical topology.

FIGS. 4A-4C illustrate an embodiment of a logical-to-physical single mapping scheme 400 that protects against single link failures. The scheme 400 is applied to a network similar to the networks 100, 200, and 300. The scheme 400 is similar to the survivable mapping algorithm by ring trimming (SMART) described in M. Kurant, et al., "Survivable Routing of Mesh Topologies in IP-over-WDM Networks by Recursive Graph Contraction," Institute of Electrical and Electronics Engineers (IEEE) Journal on Selected Areas in Communications, Vol. 25, No. 5, June 2007, which is incorporated herein by reference. The scheme 400 begins with selecting a subgraph from a logical topology and finding a survivable mapping for the subgraph over a physical topology. For example, the subgraph is in the form of a ring. After selecting a mapping, the scheme 400 contracts the logical topology by shrinking the subgraph to a node and repeats the mapping process over the new contracted logical topology.

FIG. 4A is a schematic diagram illustrating an embodiment of a first mapping scenario 410 between a logical topology 412 and a physical topology 411. The physical topology 411 comprises a plurality of physical links, shown as $a^\Phi, b^\Phi, c^\Phi, d^\Phi, e^\Phi, f^\Phi$, and $g^\Phi$, similar to the physical links 112, 212, 312, and 313. The physical topology 411 is represented by $G^\Phi\{=a^\Phi, b^\Phi, c^\Phi, d^\Phi, e^\Phi, f^\Phi, g^\Phi\}$. The logical topology 412 comprises a plurality of logical links, shown as $a^L, b^L, c^L, d^L, e^L, f^L, g^L$, and $h^L$, similar to the logical links 122, 222, 322, and 323. The logical topology 412 is represented by $G^L=\{a^L, b^L, c^L, d^L, e^L, g^L, h^L\}$. For example, a first subgraph 413 and a second subgraph 414 are selected from the logical topology 412. The first subgraph 413 traverses the logical links $a^L, b^L$, and $c^L$ forming a first ring. The second subgraph 414 traverses the logical links $f^L, g^L$, and $h^L$ forming a second ring. A first mapping, represented by $M_A$, is generated for a first set of logical links, represented by $A=\{a^L, b^L, c^L, f^L, g^L, h^L\}$. For example, the first subgraph 413 is mapped to a first subset of the physical links shown by the paths 415, which includes the physical links $a^\Phi, b^\Phi$, and $c^\Phi$. The second subgraph 414 is mapped to a second subset of the physical links shown by the paths 416, which includes $b^\Phi, d^\Phi, e^\Phi, f^\Phi$, and $g^\Phi$. After generating the first mapping $M_A$, the first subgraph 413 is contracted to a single node, shown as $u^c$, and the second subgraph 414 is contracted to a single node, shown as $v^c$. The nodes $u^c$ and $v^c$ are connected by the logical links $e^L$ and $d^L$, generating a contracted logical topology 417. The contracted logical topology 417 is represented by $G^c=G^L\downarrow A$.

FIG. 4B is a schematic diagram illustrating an embodiment of a second mapping scenario 420 between the logical topology 412 and the physical topology 411. After generating the first mapping $M_A$ and contracting the logical topology 412 to the contracted logical topology 417, a second mapping, represented by $M_B$, is generated for a second set of links, represented by $B=\{e^L, d^L\}$ in the scenario 420. The second mapping $M_B$ maps the logical link $d^L$ to a set of paths 421, which includes $a^\Phi, c^\Phi$, and $d^\Phi$ and the logical link $e^L$ to a set of paths 422, which includes $g^\Phi$ and $b^\Phi$.

FIG. 4C is a schematic diagram illustrating an embodiment of a final mapping scenario 430 between the logical topology 412 and the physical topology 411. In the scenario 430, a full mapping, $M_E$ is generated for the full set of logical links, which is a union of A and B. The full set of logical links is represented by $E=A \cup B=\{a^L, b^L, c^L, d^L, e^L, f^L, g^L, h^L\}$. As shown, the paths 415 and 416 mapped from the first mapping $M_A$ and the paths 421 and 422 mapped from the second mapping $M_B$ are combined to produce the full mapping $M_E$.

The link mapping and subgraph contracting mechanisms in scheme 400 are relatively efficient in providing a full mapping for a cross-layered network. However, the scheme 400 generates a single mapping for each logical link and a single mapping design may not survive dual link failures as shown in the networks 100, 200, and 300.

Disclosed herein are embodiments for mapping a logical network onto a physical network for protection against dual physical link failures. The disclosed embodiments map the logical network onto the physical network in portions. For example, a subgraph in the form of a logical ring is identified in the logical network. The logical ring is formed from a plurality of nodes interconnected by a plurality of logical links. The mapping of the logical ring begins with finding a physical ring in the physical network that traverses at least the plurality of nodes in the same order as the logical ring. After finding the physical ring, a plurality of cross cord paths is computed across the physical ring between nonadjacent logical ring nodes on the physical ring. To provide dual link survivability, a primary path and a secondary path are determined for each logical link. The primary paths are mapped onto the physical ring. The secondary paths are mapped to both the cross cord paths and the physical ring. By employing cross cord paths that intersect with each other, the routing of the primary paths and the secondary paths ensure that at least one secondary path of a logical link in any pair of logical links has no overlap with the primary path of the other logical link. Thus, the employment of the double logical-to-physical mapping and the cross cord paths enable the logical ring to survive any dual physical link failures. After completing the mapping, the logical ring is contracted to a single contracted node, which may be used to form another logical ring in the logical network, and the mapping process is repeated until the entire logical network is mapped onto the physical network. The disclosed embodiments are suitable for mapping any types of logical networks, such as IP networks, virtual networks, SDNs, onto any types of physical networks, such as electrical networks and optical networks. The disclosed embodiments may be employed in conjunction with other physical layer protection schemes. The disclosed embodiments may be implemented during network planning or may be employed to dynamically route a logical network over a physical network. The disclosed embodiments may improve dual link failure resiliency in a network and limit resource overbuilt.

FIGS. 5A-5D illustrate an embodiment of a logical-to-physical mapping scheme 500 that protects against dual physical link failures. The scheme 500 is applied to a network similar to the network 100. In one embodiment, the scheme 500 is applied during network planning. For example, a network operator may execute software implementing the scheme 500 to determine a double mapping between a logical network such as the logical layers 120, 220, and 320 and a physical network such as the physical layers 110, 210, and 310. The logical network may be an IP network and the physical network may be an optical network. In another embodiment, the scheme 500 is employed by a network controller or an SDN controller to determine a double mapping between a virtual network or an SDN-enabled network and a physical network. The scheme 500 is applied after selecting a logical ring similar to the subgraphs 413 and 414 from a logical topology similar to the logical topology 412 and the logical layers 120, 220, and 320. The scheme 500 maps the logical ring onto a physical topology similar to the physical topology 411 and the physical layers 110, 210, and 310. To protect the network against dual link failures, the scheme 500 selects a physical ring from the physical topology, constructs cross cord paths, and maps each link along the logical ring to a primary path traversing a portion of the physical ring and a secondary path traversing one of the cross cord paths, as described more fully below.

Figure 5A:
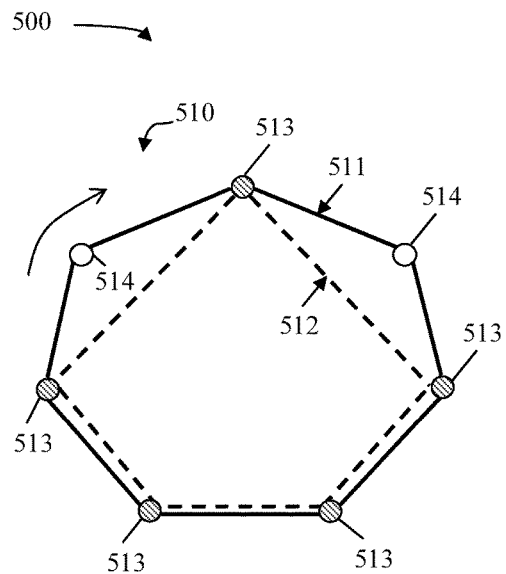
FIG. 5A is a schematic diagram illustrating an embodiment of a physical ring construction scenario for mapping a logical ring onto a physical ring.

FIG. 5A is a schematic diagram illustrating an embodiment of a physical ring construction scenario 510 for mapping a logical ring 512 onto a physical ring 511. The logical ring 512 is represented by thick dashed lines. The physical ring 511 is represented by thick solid lines. The logical ring 512 is selected from a logical topology. The physical ring 511 is determined from a physical topology. The logical ring 512 traverses a plurality of nodes 513 similar to the nodes 111 and 121. Each segment of the logical ring 512 between two neighboring nodes 513 corresponds to a logical link similar to the logical links 122, 222, 322, and 323. The scheme 500 selects the physical ring 511 such that the physical ring 511 traverses at least the nodes 513 on the logical ring 512 in the same order as the logical ring 512. As shown, a clockwise direction is employed for the ordering of the logical ring 512 and the physical ring 511. The physical ring 511 may traverse more nodes than the logical ring 512. As shown, the physical ring 511 traverses additional nodes 514. Each segment of the physical ring 511 between two neighboring nodes 513 and/or 514 corresponds to a physical link similar to the physical links 112, 212, 312, and 313. In an embodiment, the physical ring 511 is determined by computing shortest paths between successive nodes 513 in the logical ring 512 without traversing a node 513 or 514 twice.

Figure 5B:
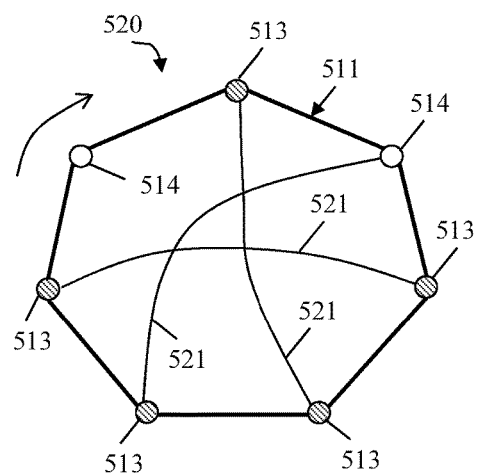
FIG. 5B is a schematic diagram illustrating an embodiment of a cross cord path construction scenario.

FIG. 5B is a schematic diagram illustrating an embodiment of a cross cord path construction scenario 520. After constructing the physical ring 511 as shown in the scenario 510, a set of cross cord paths 521 is computed for the physical ring 511. The cross cord paths 521 are shown as thin solid lines. A cross cord path 521 is a physical path that traverses across the physical ring 511 and intersects another cord path 521 or shares a common end node 513 with another cord path 521. The cross cord paths 521 are computed such that every node 513 in the logical ring 512 is reachable via a cross cord path 521. The details of computing the cross cord paths 521 are described more fully below.

Figure 5C:
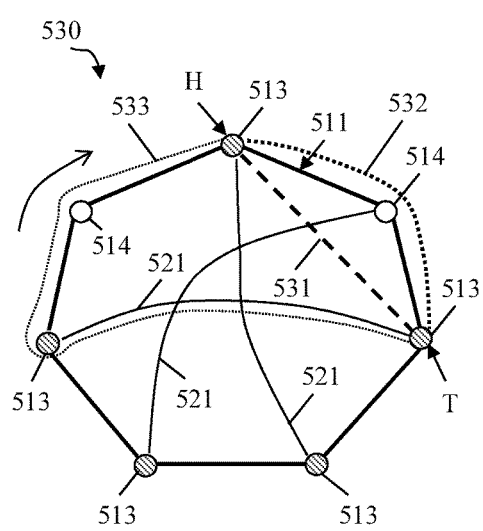
FIG. 5C is a schematic diagram illustrating an embodiment of a routing scenario for routing a first logical link.

FIG. 5C is a schematic diagram illustrating an embodiment of a routing scenario 530 for routing a first logical link 531. After constructing the cross cord paths 521 as described in the scenario 520, the scheme 500 determines a primary path 532 and a secondary path 533 for a first logical link 531. For example, the scheme 500 selects a direction of rotation such as a clockwise direction and sorts the logical links according to the direction of rotation. Next, the scheme 500 begins routing by arbitrarily selecting the first logical link 531 from the logical ring 512 shown in FIG. 5A. As shown, the first logical link 531 connects two end nodes 513. The end node 513 at which the logical ring 512 first traversed according to the selected direction is referred to as a head node, shown as H, and the other end node 513 is referred to as a tail node, shown as T. The scheme 500 determines the primary path 532 for the first logical link 531 by selecting segments of the physical ring 511 between the two end nodes H and T 513 of the first logical link 531 in the selected direction. Thus, the primary path 532 traverses the physical ring 511 in the same order as the logical ring 512. The primary path 532 is shown as a thick dotted line. The scheme 500 determines the secondary path 533 for the first logical link 531 by beginning at the tail node T 513, traversing a cross cord path 521 connecting to the tail node T 513, reaching the other end node 513 of the cross cord path 521, and followed by looping back along the physical ring 511 in the selected direction until reaching the head node H 513. The secondary path 533 is shown as a thin dotted line.

Figure 5D:
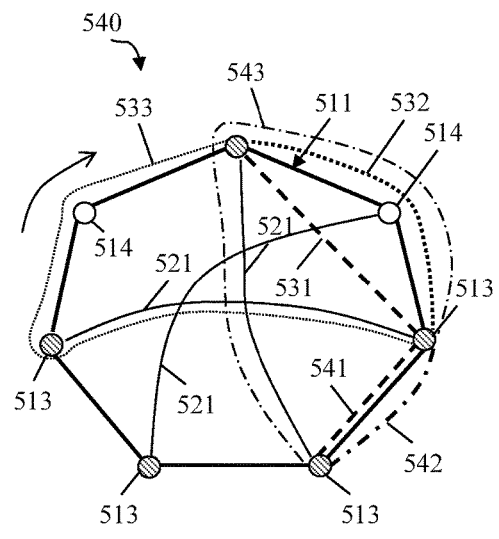
FIG. 5D is a schematic diagram illustrating an embodiment of a routing scenario for routing a second logical link.

FIG. 5D is a schematic diagram illustrating an embodiment of a routing scenario 540 for routing a second logical link 541. The second logical link 541 may be any other logical link on the logical ring 512 shown in FIG. 5A. The scheme 500 determines a primary path 542 and a secondary path 543 for the second logical link 541 by employing the same mechanisms as described in the routing scenario 520. The primary path 542 is shown as a thick dot-dashed line and the secondary path 543 is shown as a thin dot-dashed line. The routing mechanisms employed by the scheme 500 allow the logical ring 512 to survive under any dual link failures, as described more fully below. The selections of primary paths such as the primary paths 532 and 542 and secondary paths such as the secondary paths 533 and 543 are repeated until all logical links on the logical ring 512 are mapped onto the physical ring 511 and cross cord paths 521. As can be seen, in order to support the mapping of primary paths onto a physical ring 511 and secondary paths onto cross cord paths 521, a physical topology is required to be at least three-connected.

Figure 6:
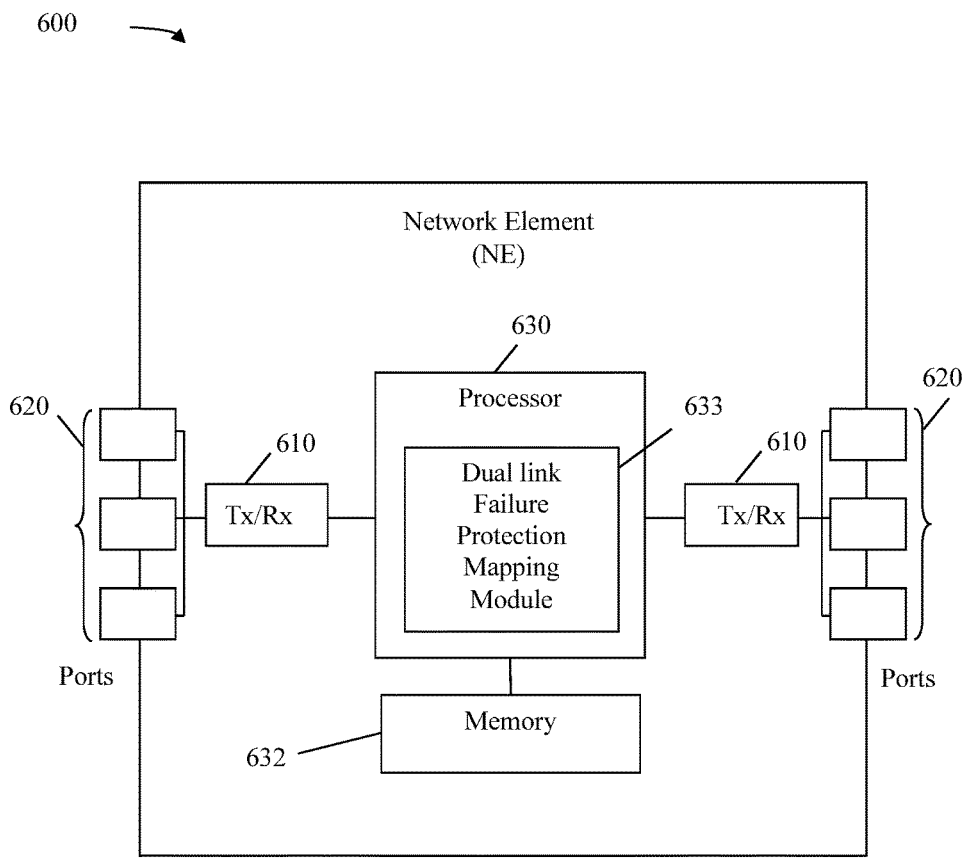
FIG. 6 is a schematic diagram of an embodiment of an NE.

FIG. 6 is a schematic diagram of an embodiment of an NE 600, such as a network controller 130, an SDN controller, or any device used for generating logical-to-physical mappings as described in the network 100 and the scheme 600 to provide dual failure survivability. NE 600 may be implemented in a single node or the functionality of NE 600 may be implemented in a plurality of nodes. One skilled in the art will recognize that the term NE encompasses a broad range of devices of which NE 600 is merely an example. NE 600 is included for purposes of clarity of discussion, but is in no way meant to limit the application of the present disclosure to a particular NE embodiment or class of NE embodiments.

At least some of the features/methods described in the disclosure are implemented in a network apparatus or component such as an NE 600. For instance, the features/methods in the disclosure may be implemented using hardware, firmware, and/or software installed to run on hardware. The NE 600 is any device that transports packets through a network, e.g., a switch, router, bridge, server, a client, etc. As shown in FIG. 6, the NE 600 comprises transceivers (Tx/Rx) 610, which may be transmitters, receivers, or combinations thereof. The Tx/Rx 610 is coupled to a plurality of ports 620 for transmitting and/or receiving frames from other nodes.

A processor 630 is coupled to each Tx/Rx 610 to process the frames and/or determine which nodes to send the frames to. The processor 630 may comprise one or more multi-core processors and/or memory devices 632, which may function as data stores, buffers, etc. The processor 630 may be implemented as a general processor or may be part of one or more application specific integrated circuits (ASICs) and/or digital signal processors (DSPs). The processor 630 may comprise a dual link failure protection mapping module 633, which may perform logical-to-physical topology mappings and may implement methods 1200, 1300, and 1400, as discussed more fully below, and/or any other flowcharts, schemes, and methods discussed herein. As such, the inclusion of the dual link failure protection mapping module 633 and associated methods and systems provide improvements to the functionality of the NE 600. Further, the dual link failure protection mapping effects a transformation of a particular article (e.g., the network) to a different state. In an alternative embodiment, the dual link failure protection mapping module 633 may be implemented as instructions stored in the memory devices 632, which may be executed by the processor 630. The memory device 632 may comprise a cache for temporarily storing content, e.g., a random-access memory (RAM). Additionally, the memory device 632 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 632 may be configured to store one or more routing tables.

It is understood that by programming and/or loading executable instructions onto the NE 600, at least one of the processor 630 and/or memory device 632 are changed, transforming the NE 600 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 7:
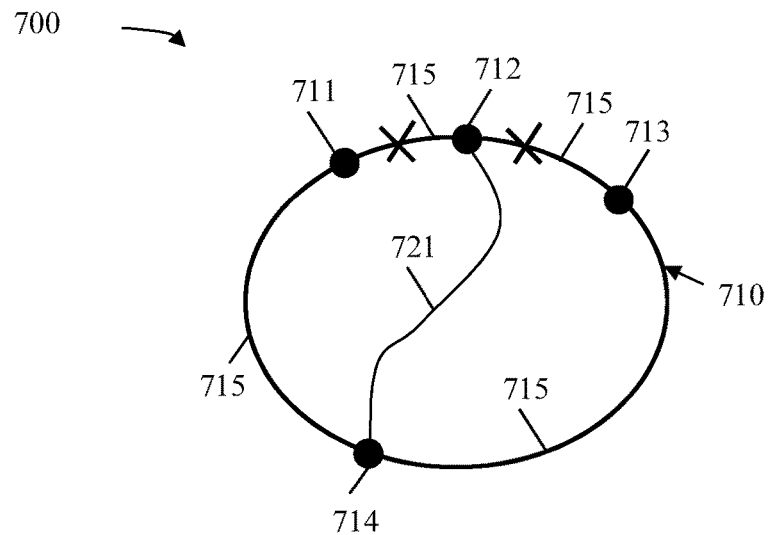
FIG. 7 is a schematic diagram illustrating an embodiment of a cord path construction scheme.

FIG. 7 is a schematic diagram illustrating an embodiment of a cord path construction scheme 700. The scheme 700 is employed by a NE, such as the NE 700, a network controller, an SDN controller, or network planning software. The scheme 700 may be applied to any three-connected physical topologies. The scheme 700 is implemented after constructing a physical ring 710 similar to the physical ring 511 for a logical ring similar to the logical ring 512 as described in the scenario 510. The scheme 700 is employed to construct a first cord path 721 such as the cross cord paths 521 in the physical ring 710. The physical ring 710 comprises a plurality of nodes 711, 712, 713, and 714 similar to the nodes 111, 121, 513, and 514 interconnected by a plurality of physical links 715 similar to the physical links 112, 212, 312, and 313. The plurality of nodes 711-714 correspond to nodes in the logical ring. As an example, the scheme 700 determines to construct a first cord path 721 beginning at the node 712. To construct the first cord path 721, the scheme 700 excludes the physical links 715 adjacent to the node 712 as shown by the crosses and computes a path such as a shortest path from the node 712 to another node on the physical ring 710. By excluding the adjacent physical links 715, any routing algorithm may find a first cord path 721 cutting across the physical ring 710 since the physical topology is at least three-connected. As shown, the first cord path 721 extends between the node 712 and 714.

Figure 8:
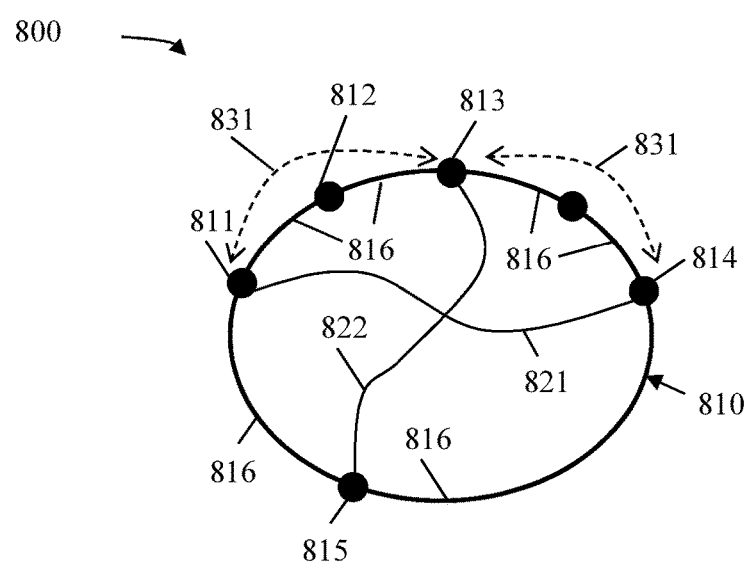
FIG. 8 is a schematic diagram illustrating an embodiment of a cross cord path construction scheme.

FIG. 8 is a schematic diagram illustrating an embodiment of a cross cord path construction scheme 800. The scheme 800 is implemented by a NE, such as the NE 700, a network controller, an SDN controller, or network planning software. The scheme 800 may be applied to any three-connected physical topologies. The scheme 800 is implemented after constructing a physical ring 810 similar to the physical rings 511 and 710 for a logical ring, such as the logical ring 512 as described in the scenario 510 and at least one cord path, such as the cord paths 521 and 721, by employing the scheme 700. The physical ring 810 comprises a plurality of nodes 811, 812, 813, 814, and 815 interconnected by a plurality of physical links 816. The nodes 811-815 are similar to the nodes 111, 121, 513, 514, and 711-714 and correspond to nodes on the logical ring. The physical links 816 are similar to the physical links 112, 212, 312, 313, and 715. As shown, a first cord path 821 extending between two end nodes 811 and 814 is constructed. To construct a second cord path 822 such that the second cord path 822 intersects with the first cord path 821, the scheme 800 selects a node 813 between the end nodes 811 and 814 and shrinks the physical links 816 along the physical ring 810 between the node 813 and the end nodes 811 and 814 as shown by the arrows 831. It should be noted that the physical links 816 that are shrunk or excluded are non-overlapping. After shrinking the physical links 816, the scheme 800 computes the second cord path 822 from the node 813 to another node on the physical ring 810. As shown, the computed second cord path 822 extends from node 813 to the node 815. By shrinking the end nodes 811 and 814 to the beginning node 813 of the second cord path 822, the second cord path 822 is guaranteed to intersect the first cord path 821 by employing any routing algorithm.

Figure 9:
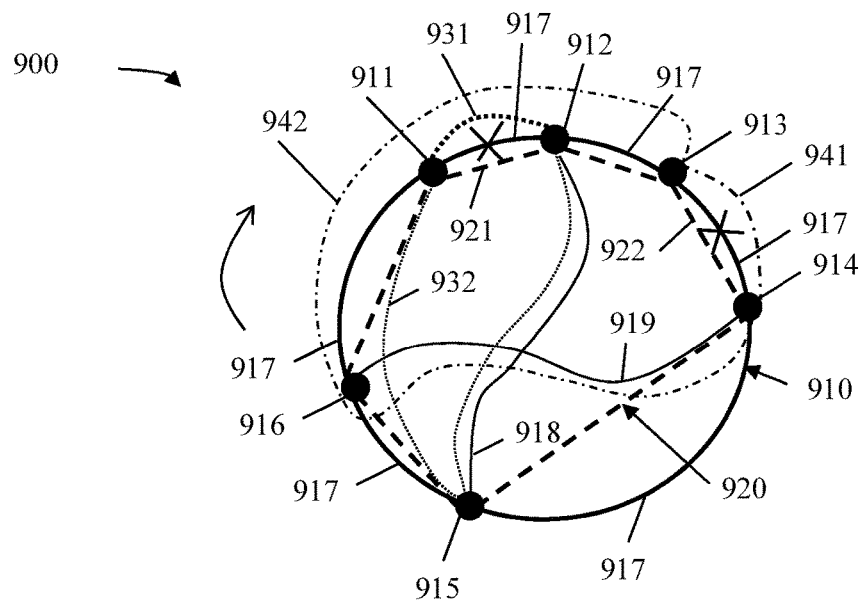
FIG. 9 is a schematic diagram illustrating an embodiment of a dual link survivability scenario.

FIG. 9 is a schematic diagram illustrating a dual link survivability scenario 900 provided by the schemes 600, 800, and 900. In the scenario 900, a physical ring 910 similar to the physical rings 511, 710, and 810 is determined according to a logical ring 920 similar to the logical ring 512. As shown, the physical ring 910 comprises a plurality of nodes 911, 912, 913, 914, 915, 916 interconnected by a plurality of physical links 917 and a plurality of cross cord paths 918 and 919 are computed across the physical ring 910 similar to the scenarios 510 and 520. The nodes 911-916 are similar to the nodes 111, 121, 513, 514, 711-714, and 811-815 and correspond to nodes on the logical ring 920. The physical links 917 are similar to the physical links 112, 212, 312, 313, 715, and 816. The cross cord paths 918 and 919 are similar to the cord paths 521, 721, 821, and 822.

The scenario 900 only illustrates the mappings of a first logical link 921 and a second logical link 922 along the logical ring 920 for simplicity. The first logical link 921 is between the nodes 911 and 912 and comprises a primary path 931 shown as a thick dotted curve and a secondary path 932 shown as a thin dotted curve. The second logical link 922 is between the nodes 913 and 914 and comprises a primary path 941 shown as a thick dot-dashed curve and a secondary path 942 shown as a thin dot-dashed curve. The primary paths 931 and 941 and the secondary paths 932 and 942 are generated as described in the scenarios 530 and 540. By examining the logical ring 920 and the physical ring 910, the logical ring is disconnected only when two of the physical links 917 on the physical ring 910 are in failure. However, the routings of secondary paths over cross cord paths guarantee that at least one secondary path does not overlap with a primary path of another logical link. Thus, the logical ring 920 remains connected under any dual physical link failures. As an example, when dual failures occur at a first physical link 917 between the nodes 911 and 912 and at a second physical link 917 between the nodes 913 and 914, the primary path 931 of the first logical link 921, the primary path 941 and the secondary path 942 of the second logical link 922 are disconnected. However, the secondary path 932 of the first logical link 921 survives the dual failures. Thus, the logical ring 920 is still connected. Therefore, the schemes 600, 800, and 900 generate logical-to-physical mappings that survive dual physical link failures.

Figure 10:
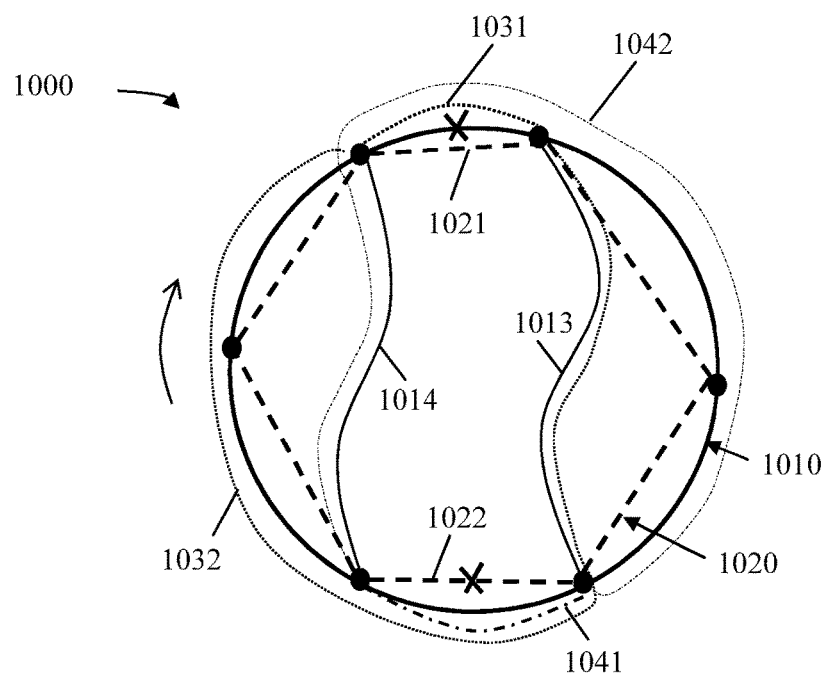
FIG. 10 is a schematic diagram illustrating an embodiment of a dual link failure scenario.

FIG. 10 is a schematic diagram illustrating an embodiment of a dual link failure scenario 1000. The scenario 1000 illustrates the importance of routing with cross cord paths such as the cross cord paths 521, 721, 821, 822, 918, and 919. For example, a physical ring 1010 and cord paths 1013 and 1014 are constructed for a logical ring 1020. The physical ring 1010 is similar to the physical rings 511, 710, 810, and 910. The logical ring 1020 is similar to the logical rings 512 and 920. However, the cord paths 1013 and 1014 are not constructed as cross cord paths according to the schemes 500, 700, and 800. When there are non-intersecting cord paths 1013 and 1014 in the physical ring 1010, the routing mechanisms described above in the scenarios 530 and 540 may not guarantee at least one secondary path such as the secondary paths 533, 543, 932, and 942 is non-overlapped with a primary path such as the primary paths 532, 542, 931, and 941 of another logical link such as the logical links 122, 222, 322, 323, 531, 541, 921, and 922.

As an example, a first logical link 1021 of the logical ring 1020 comprises a primary path 1031 mapped onto the physical ring 1010 and a secondary path 1032 mapped onto the cord path 1013. Similarly, a second logical link 1022 of the logical ring 1020 comprises a primary path 1041 mapped onto the physical ring 1010 and a secondary path 1042 mapped onto the cord path 1014. Since the cord paths 1013 and 1014 do not intersect with each other, the secondary path 1032 of the first logical link 1021 overlaps with the primary path 1041 of the second logical link 1022. Similarly, the secondary path 1042 of the second logical link 1022 overlaps with the primary path 1031 of the first logical link 1021. When dual link failures occur at the physical ring 1010 as shown by the crosses, the primary path 1031 and the secondary path 1032 of the first logical link 1021 and the primary path 1041 and the secondary path 1042 of the second logical link 1022 all fail. Therefore, routing with non-intersecting cord paths may not provide dual link failure protection.

Figure 11:
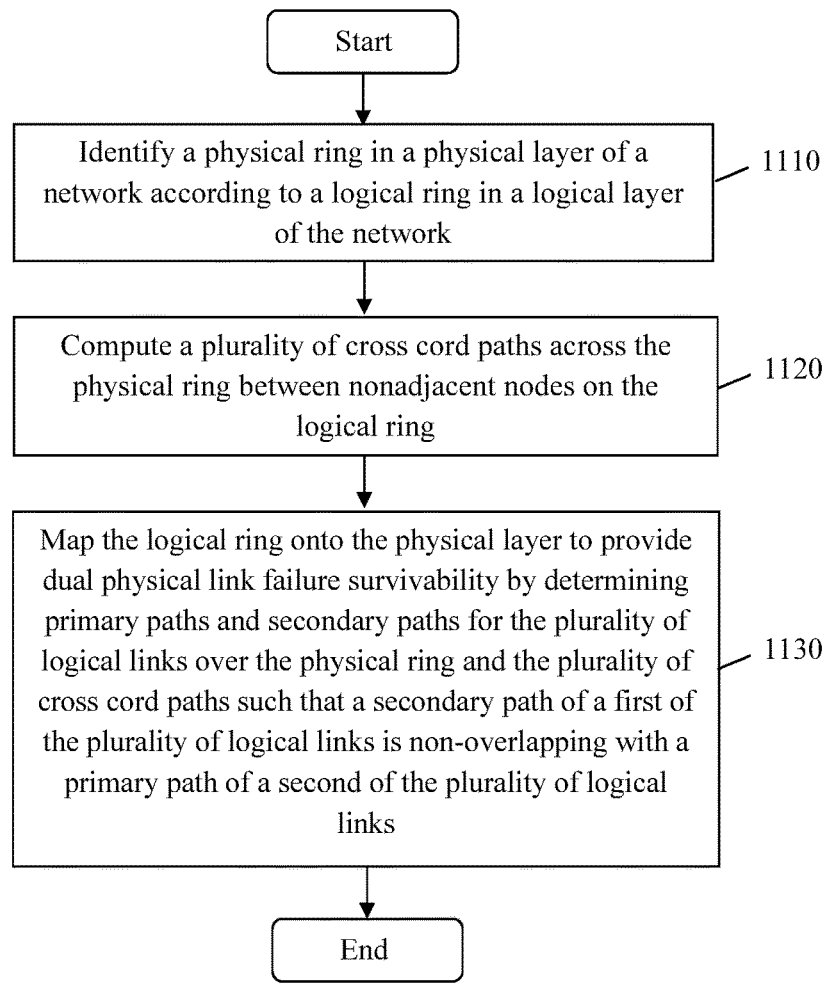
FIG. 11 is a flowchart of an embodiment of a method for performing cross layer mapping to provide dual link survivability.

FIG. 11 is a flowchart of an embodiment of a method 1100 for performing cross layer mapping to provide dual link survivability. The method 1100 is implemented by a NE, such as the NE 700, a network controller, an SDN controller, or network planning software. The method 1100 employs similar mechanism as the schemes 500, 700, and 800. The method 1100 is implemented when mapping a logical ring, such as the logical rings 512, 920, and 1020, in a logical layer, such as the logical layer 120, of a network onto a physical layer, such as the physical layer 110, of the network. For example, the logical ring is formed from a plurality of nodes, such as the nodes 111, 121, 513, 514, 711-714, and 811-815, interconnected by a plurality of logical links, such as the logical links 122, 222, 322, 323, 531, 541, 921, and 922. The nodes on the logical ring forms an ordered set of nodes arranged in a ring topology in the logical layer. At step 1110, a physical ring, such as the physical rings 511, 710, 810, 910, and 1010, is identified in the physical layer of the network according to the logical ring in the logical layer of the network. The physical ring is formed from at least the plurality of nodes interconnected by a first plurality of physical links, such as the physical links 112, 212, 312, 313, 715, 816, and 917. For example, the physical ring is identified by computing successive shortest paths between neighboring nodes of the logical ring without traversing any node in the network more than once. At step 1120, a plurality of cross cord paths, such as the cross cord paths 521, 721, 821, 822, 918, and 919, is computed across the physical ring between nonadjacent nodes on the logical ring. The plurality of cross cord paths traverses a second plurality of physical links. In an embodiment, the second plurality of physical links may overlap with some of the first plurality of physical links. At step 1130, the logical ring is mapped onto the physical layer to provide dual physical link failure survivability by determining primary paths, such as the primary paths 532, 542, 931, and 941, and secondary paths, such as the secondary paths 533, 543, 932, and 942 for the plurality of logical links over the physical ring and the plurality of cross cord paths. The primary paths are mapped onto the physical ring and the secondary paths are mapped onto the plurality of cross cord paths and the physical ring as described in the scheme 500. The primary paths and the secondary paths are mapped such that a secondary path of a first of the plurality of logical links is non-overlapping with a primary path of a second of the plurality of logical links. After completing the method 1100, the logical ring may be contracted into a single contracted node and the method 1100 may be repeated over the contracted logical network.

Figure 12:
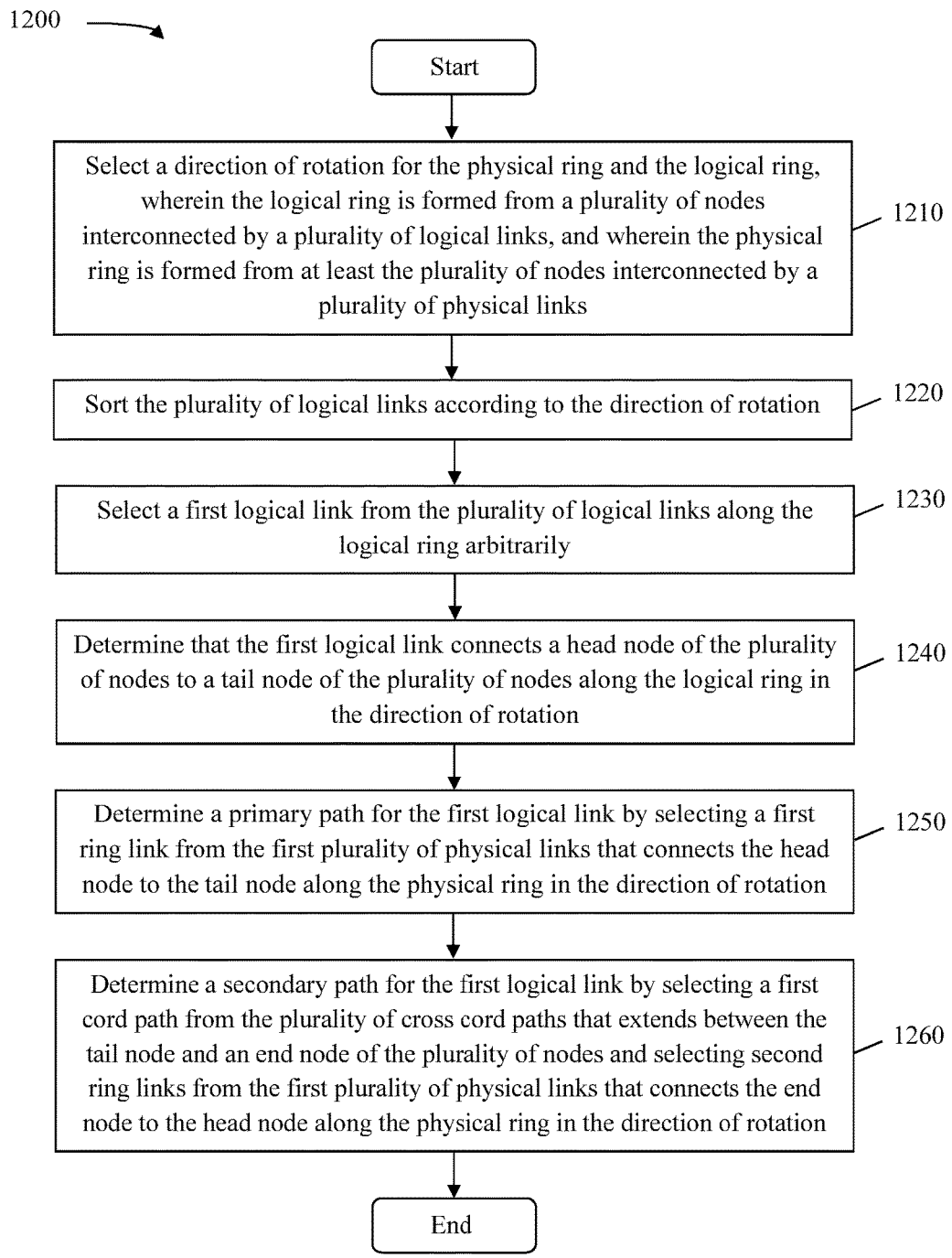
FIG. 12 is a flowchart of an embodiment of a method for determining dual link survivable routing of a logical ring for dual link survivability.

FIG. 12 is a flowchart of an embodiment of a method 1200 for determining routing of a logical ring for dual link survivability. The method 1200 is implemented by a NE, such as the NE 700, a network controller, an SDN controller, or network planning software. The method 1200 employs similar mechanisms as the schemes 500, 700, and 800. The method 1200 is implemented after identifying a physical ring, such as the physical rings 511, 710, 810, 910, and 1010, for a logical ring, such as the logical rings 512, 920, and 1020, and determining a plurality of cross cord paths, such as the cord paths 521, 721, 821, 822, 918, and 919, across the physical ring. For example, the step 1230 of the method 1200 employs the method 1200 to determine routing paths for the logical ring.

At step 1210, a direction of rotation is selected for the physical ring and the logical ring. The direction of rotation may be clockwise or counter clockwise. The logical ring is formed from a plurality of nodes, such as the nodes 111, 121, 513, 514, 711-714, and 811-815, interconnected by a plurality of logical links, such as the logical links 122, 222, 322, 323, 531, 541, 921 and 922, in a logical layer, such as the logical layer 120. The physical ring is formed from at least the plurality of nodes interconnected by a plurality of physical links, such as the physical links 112, 212, 312, 313, 715, 816, and 917. At step 1220, the plurality of logical links is sorted according to the direction of rotation. At step 1230, a first logical link is arbitrarily selected from the plurality of logical links along the logical ring. At step 1240, a determination is made that the first logical link connects a head node of the plurality of nodes to a tail node of the plurality of nodes along the logical ring in the direction of rotation.

At step 1250, a primary path, such as the primary paths 532, 542, 931, and 941, is determined for the first logical link by selecting a first ring link from the first plurality of physical links that connects the head node to the tail node along the physical ring in the direction of rotation. At step 1260, a secondary path, such as the secondary paths 533, 543, 932, and 942, is determined for the first logical link. The secondary path comprises two segments, a first segment and a second segment. To determine the first segment, a first cord path is selected from the plurality of cross cord paths that extends between the tail node and an end node of the plurality of nodes. To determine the second segment, second ring links are selected from the first plurality of physical links that connect the end node to the head node along the physical ring in the direction of rotation. The steps of 1230-1260 may be repeated for another logical link on the logical ring to select a primary path and a secondary path for the other logical link.

Figure 13:
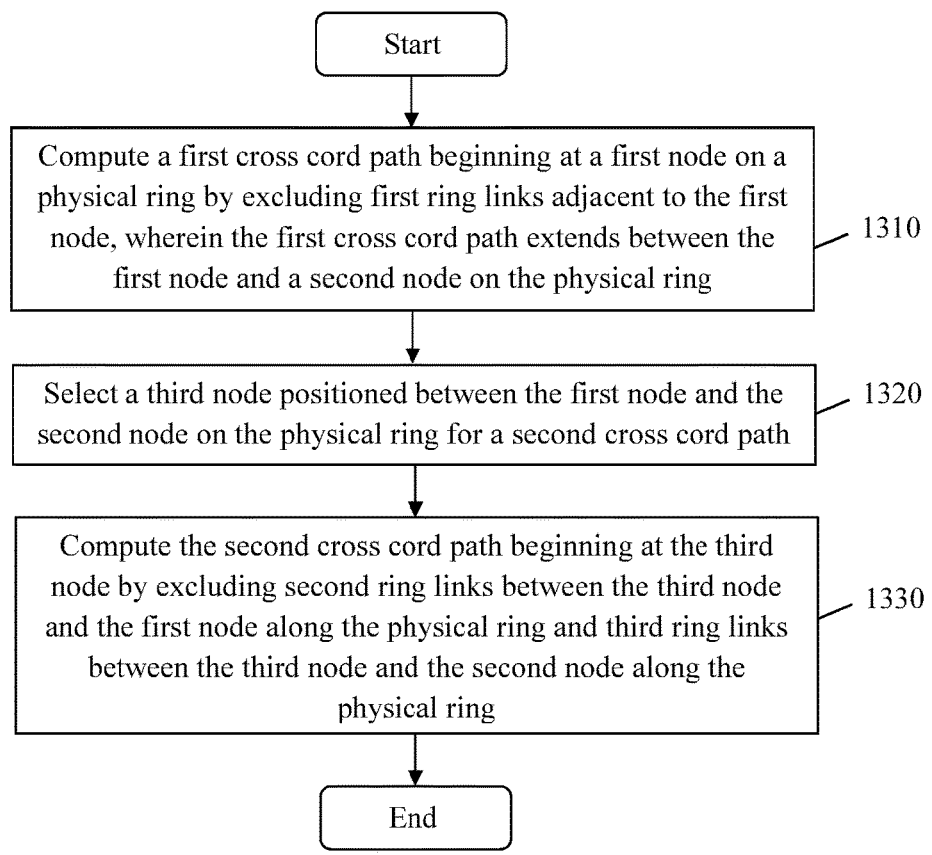
FIG. 13 is a flowchart of an embodiment of a method for computing cross cord paths.

FIG. 13 is a flowchart of an embodiment of a method 1300 for computing cross cord paths, such as the cross cord paths 521, 721, 821, 822, 918, and 919. The method 1300 is implemented by a NE, such as the NE 700, a network controller, an SDN controller, or network planning software. The method 1300 employs similar mechanisms as the schemes 500, 700, and 800. The method 1300 is implemented after identifying a physical ring, such as the physical rings 511, 710, 810, 910, and 1010, for a logical ring, such as the logical rings 512, 920, and 1020. For example, the step 1220 of the method 1200 employs the method 1300 to compute cross cord paths across the physical ring. The physical ring is formed from a plurality of nodes, such as the nodes 111, 121, 513, 514, 711-714, and 811-815, interconnected by a plurality of logical links, such as the logical links 122, 222, 322, 323, 531, 541, 921, and 922. At step 1310, a first cross cord path is computed beginning at a first node on the physical ring by excluding first ring links adjacent to the first node as described in the scheme 700. The first cross cord path extends between the first node and a second node on the physical ring. At step 1320, a third node positioned between the first node and the second node on the physical ring is selected for a second cross cord path. At step 1330, the second cross cord path is computed beginning at the third node by excluding second ring links between the third node and the first node along the physical ring and third ring links between the third node and the second node along the physical ring as described in the scheme 800.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   identifying, via a processor of a network element (NE), a physical ring in a physical layer of a network according to a logical ring in a logical layer of the network, the logical ring being formed from a plurality of nodes interconnected by a plurality of logical links, and the physical ring being formed from at least the plurality of nodes interconnected by a first plurality of physical links;
   computing, via the processor, a plurality of cross cord paths across the physical ring between nonadjacent nodes on the logical ring, the plurality of cross cord paths traversing a second plurality of physical links, a first of the plurality of cross cord paths computed by excluding first ring links of the first plurality of physical links that are adjacent to a first node of the first of the plurality of cross cord paths, and the first node being a first of the plurality of nodes; and
   mapping, via the processor, the logical ring onto the physical layer to provide dual physical link failure survivability by determining primary paths and secondary paths for the plurality of logical links over the physical ring and the plurality of cross cord paths, a secondary path of a first of the plurality of logical links being non-overlapping with a primary path of a second of the plurality of logical links.

2. The method of claim 1, wherein mapping the logical ring comprises:
   selecting a direction of rotation for the logical ring and the physical ring;
   sorting the plurality of logical links according to the direction of rotation; and
   determining that the first logical link connects a head node of the plurality of nodes to a tail node of the plurality of nodes along the logical ring in the direction of rotation.

3. The method of claim 2, wherein computing the primary path for the first logical link comprises selecting a first ring link from the first plurality of physical links that connects the head node to the tail node along the physical ring in the direction of rotation.

4. The method of claim 3, wherein computing the secondary path for the first logical link comprises:
   selecting a first cord path from the plurality of cross cord paths that extends between the tail node and an end node of the plurality of nodes; and
   selecting second ring links from the first plurality of physical links that connect the end node to the head node along the physical ring in the direction of rotation.

5. The method of claim 1, wherein computing the plurality of cross cord paths comprises:
   selecting a third of the plurality of nodes positioned between the first node and a second node of the plurality of nodes on the physical ring; and
   computing a second of the plurality of cross cord paths beginning at the third node by excluding second ring links of the first plurality of physical links between the third node and the first node along the physical ring and third ring links of the first plurality of physical links between the third node and the second node along the physical ring, and
   wherein the second ring links are different from the third ring links, and
   wherein the first cross cord path extends between the first node and the second node of the plurality of nodes.

6. The method of claim 1, wherein the first of the plurality of cross cord paths crosses at least a second of the plurality of cross cord paths.

7. The method of claim 1, wherein the first of the plurality of cross cord paths extends between the first of the plurality of nodes and a second of the plurality of nodes, wherein a second of the plurality of cross cord paths extends between the second node and a third of the plurality of nodes, and wherein the first node is different from the third node.

8. The method of claim 1, wherein the physical layer comprises an optical network.

9. The method of claim 1, wherein the logical layer comprises an Internet protocol (IP) network.

10. The method of claim 1, wherein the logical layer comprises a virtual network.

11. A non-transitory medium configured to store a computer program product comprising computer executable instructions that when executed by a processor cause the processor to:
    identify a physical ring in a physical layer of a network according to a logical ring in a logical layer of the network, the logical ring being formed from a set of ordered nodes interconnected by a plurality of logical links, and the physical ring being formed from at least the set of ordered nodes interconnected by a first plurality of physical links;
    compute a plurality of cross cord paths across the physical ring in the physical layer between nonadjacent nodes on the logical ring, the plurality of cross cord paths traversing a second plurality of physical links, a first of the plurality of cross cord paths computed by excluding first ring links of the first plurality of physical links that are adjacent to a first node of the first of the plurality of cross cord paths, and the first node being a first of the set of ordered nodes; and
    determine a primary path and a secondary path for each of the plurality of logical links according to the physical ring and the plurality of cross cord paths, a secondary path of a first of the plurality of logical links being non-overlapping with a primary path of a second of the plurality of logical links.

12. The non-transitory medium of claim 11, wherein the instructions further cause the processor to select a direction of rotation for the physical ring and the logical ring for determining the primary path and the secondary path for each of the plurality of logical links.

13. The non-transitory medium of claim 12, wherein the instructions further cause the processor to compute the primary path for each logical link by:
    determining that each logical link connects a head node of the set of ordered nodes to a tail node of the set of ordered nodes along the logical ring in the direction of rotation; and
    selecting a first ring link from the first plurality of physical links that connects the head node to the tail node along the physical ring in the direction of rotation.

14. The non-transitory medium of claim 13, wherein the instructions further cause the processor to compute the secondary path for each logical link by:
    selecting a first cord path from the plurality of cross cord paths that extends between the tail node and an end node of the set of ordered nodes; and
    selecting second ring links from the first plurality of physical links that connect the end node to the head node along the physical ring in the direction of rotation.

15. The non-transitory medium of claim 11, wherein the instructions further cause the processor to compute the plurality of cross cord paths by:
    selecting a third of the set of ordered nodes positioned between the first node and a second node of the set of ordered nodes on the physical ring; and
    computing a second of the plurality of cross cord paths beginning at the first node by excluding the second ring links of the first plurality of physical links between the third node and the first node along the physical ring and third ring links of the first plurality of physical links between the third node and the second node along the physical ring, and
    wherein the second ring links are different from the third ring links, and
    wherein the first cross cord path extends between the first node and the second node of the set of ordered nodes.

16. A network controller comprising:
    a processor configured to:
        identify a physical ring in a physical layer of a network according to a logical ring in a logical layer of the network, the logical ring being formed from a set of ordered nodes interconnected by a plurality of logical links, and the physical ring being formed from at least the set of ordered nodes interconnected by a first plurality of physical links;
        compute a plurality of cross cord paths across the physical ring in the physical layer between nonadjacent nodes on the logical ring, the plurality of cross cord paths traversing a second plurality of physical links, a first of the plurality of cross cord paths computed by excluding first ring links of the first plurality of physical links that are adjacent to a first node of the first of the plurality of cross cord paths, and the first node being a first of the set of ordered nodes;
        determine primary paths for the plurality of links according to the physical ring; and
        determine secondary paths for the plurality of links according to both the physical ring and the plurality of cross cord paths, a secondary path of a first of the plurality of logical links being non-overlapping with a primary path of a second of the plurality of logical links; and
    a transmitter coupled to the processor and configured to send routing instructions to at least one of the set of ordered nodes,
    wherein the routing instructions indicate at least some of the primary paths and at least some of the secondary paths.

17. The network controller of claim 16, wherein the processor is further configured to:
    select a direction of rotation for the physical ring and the logical ring; and
    determine that a first of plurality of logical links connects a head node of the set of ordered nodes to a tail node of the set of ordered nodes along the logical ring in the direction of rotation, and
    wherein determining a primary path for the first logical link comprises selecting a first ring link from the first plurality of physical links that connects the head node to the tail node along the physical ring in the direction of rotation.

18. The network controller of claim 17, wherein the processor is further configured to determine the secondary path for the first logical link by:

selecting a first cord path from the plurality of cross cord paths extending between the tail node and an end node of the set of ordered nodes; and selecting second ring links from the first plurality of physical links that connect the end node to the head node along the physical ring in the direction of rotation.

19. The network controller of claim 16, wherein the processor is further configured to compute the plurality of cross cord paths by:

selecting a third of the set of ordered nodes positioned between the first node and a second node of the set of ordered nodes on the physical ring; and computing a second of the plurality of cross cord paths beginning at the first node by excluding the second ring links of the first plurality of physical links between the third node and the first node along the physical ring and third ring links of the first plurality of physical links between the third node and the second node along the physical ring, and wherein the second ring links are different from the third ring links, and wherein the first cross cord path extends between the first node and the second node of the set of ordered nodes.

20. The network controller of claim 16, wherein the logical layer comprises a software-defined network (SDN), and wherein each of the plurality of nodes are connected to at least two of the first plurality of physical links and at least one of the second plurality of physical links.

\* \* \* \* \*